United States Patent
Inbar et al.

(10) Patent No.: US 12,493,587 B2
(45) Date of Patent: Dec. 9, 2025

(54) SYSTEMS, METHODS, AND MEDIA FOR IMPLEMENTING CONFLICT-FREE REPLICATED DATA TYPES IN IN-MEMORY DATA STRUCTURES

(71) Applicant: Redis Ltd., Tel-Aviv (IL)

(72) Inventors: Yuval Inbar, Giva'ataim (IL); Yossi Gottlieb, Clil (IL)

(73) Assignee: Redis, Ltd., San Francisco, CA (US)

( * ) Notice: Subject to any disclaimer, the term of this patent is extended or adjusted under 35 U.S.C. 154(b) by 266 days.

(21) Appl. No.: 17/506,162

(22) Filed: Oct. 20, 2021

(65) Prior Publication Data

US 2022/0121627 A1 Apr. 21, 2022

Related U.S. Application Data

(60) Provisional application No. 63/094,797, filed on Oct. 21, 2020, provisional application No. 63/094,328, filed on Oct. 20, 2020.

(51) Int. Cl.

| | |
|---|---|
| *G06F 16/182* | (2019.01) |
| *G06F 16/16* | (2019.01) |
| *G06F 16/172* | (2019.01) |
| *G06F 16/178* | (2019.01) |
| *G06F 16/18* | (2019.01) |

(52) U.S. Cl.
CPC ........ *G06F 16/1844* (2019.01); *G06F 16/162* (2019.01); *G06F 16/172* (2019.01); *G06F 16/178* (2019.01); *G06F 16/1805* (2019.01)

(58) Field of Classification Search
CPC .. G06F 16/1844; G06F 16/162; G06F 16/178; G06F 16/172; G06F 16/1805
See application file for complete search history.

(56) References Cited

U.S. PATENT DOCUMENTS

| | | | |
|---|---|---|---|
| 10,846,302 B1 * | 11/2020 | Edukulla | G06F 16/27 |
| 11,042,522 B2 * | 6/2021 | Tian | G06F 16/221 |

(Continued)

OTHER PUBLICATIONS

Authors: Ming Liu and Arvind Krishnamurthy, Title: Fine-Grained Replicated State Machines for a Cluster Storage System, Date: Feb. 25-27, 2020, Publisher: University of Washington, pp. (305-323) (Year: 2020).*

(Continued)

*Primary Examiner* — Pierre Vital
*Assistant Examiner* — Zuheir A Mheir (57) ABSTRACT

Mechanisms, including systems, methods, and non-transitory computer readable media, for implementing conflict-free replicated data types in in-memory data structures are provided, the mechanisms comprising: a memory; and at least one hardware processor coupled to the memory and collectively configured to: mark a first key of a conflict-free replicated data type as to be deleted; send an update message reflecting that the first key is to be deleted to a first replica of an in-memory data structure; receive a plurality of messages each acknowledging that the first key is to be deleted; determine that the plurality of messages includes a message for each of a plurality of shards of the first replica; and in response to determining that the plurality of messages includes a message for each of the plurality of shards of the first replica, delete the first key.

20 Claims, 3 Drawing Sheets

(56) References Cited

U.S. PATENT DOCUMENTS

| | | | | |
|---|---|---|---|---|
| 11,943,291 | B2* | 3/2024 | Murstein | G06F 16/178 |
| 2015/0120658 | A1* | 4/2015 | Rath | G06F 16/27 |
| | | | | 707/623 |
| 2016/0092125 | A1* | 3/2016 | Cowling | G06F 3/0619 |
| | | | | 711/103 |
| 2016/0292179 | A1* | 10/2016 | von Muhlen | G06F 16/176 |
| 2018/0107404 | A1* | 4/2018 | Cox | G06F 3/0608 |
| 2018/0276269 | A1 | 9/2018 | Rasscevskis et al. | |
| 2019/0057028 | A1* | 2/2019 | D'Halluin | G06F 16/27 |
| 2019/0391957 | A1* | 12/2019 | Ye | G06F 16/113 |
| 2020/0014750 | A1* | 1/2020 | Murstein | G06F 16/1873 |
| 2020/0372004 | A1* | 11/2020 | Barber | G06F 16/213 |
| 2021/0165760 | A1* | 6/2021 | De Schrijver | G06F 16/1734 |
| 2022/0092050 | A1* | 3/2022 | Luo | G06F 16/2379 |
| 2022/0269601 | A1* | 8/2022 | Monteith | G06F 3/0643 |

OTHER PUBLICATIONS

International Preliminary Report on Patentability dated May 4, 2023 in PCT Application No. PCT/IL2021/051244, pp. 1-7.
International Search Report and Written Opinion dated Feb. 16, 2022 in International Patent Application No. PCT/IL2021/051244, pp. 1-11.
Liu, M., et al., "Replicated State Machines for a Cluster Storage System", In 17th USENIX Symposium of Networked Systems Design and Implementation (NSDI 20), Feb. 25-27, 2020, pp. 305-323.

* cited by examiner

SYSTEMS, METHODS, AND MEDIA FOR IMPLEMENTING CONFLICT-FREE REPLICATED DATA TYPES IN IN-MEMORY DATA STRUCTURES

CROSS-REFERENCE TO RELATED APPLICATIONS

This application claims the benefit of U.S. Provisional Patent Application No. 63/094,328, filed Oct. 20, 2020, and U.S. Provisional Patent Application No. 63/094,797, filed Oct. 21, 2020, each of which is hereby incorporated by reference herein in its entirety.

BACKGROUND

In-memory data structures (e.g., REDIS) are widely used to store data that needs to be quickly accessed for applications such as gaming, advertising, financial services, healthcare, and many other applications. In many instances, in-memory data structures can be applied in distributed systems.

Conflict-free replicated data types (CRDTs) are data structures that can be replicated across multiple nodes in a distributed system network to achieve strong eventual consistency without requiring consensus and introducing the delay and reduced availability consensus involves.

It is therefore desirable to implement CRDTs in in-memory data structures.

SUMMARY

In accordance with some embodiments, systems, methods, and media for implementing conflict-free replicated data types in in-memory data structures are provided.

In some embodiments, systems for implementing conflict-free replicated data types in in-memory data structures are provided, the systems comprising: a memory; and at least one hardware processor coupled to the memory and collectively configured to: mark a first key of a conflict-free replicated data type as to be deleted; send an update message reflecting that the first key is to be deleted to a first replica of an in-memory data structure; receive a plurality of messages each acknowledging that the first key is to be deleted; determine that the plurality of messages includes a message for each of a plurality of shards of the first replica; and in response to determining that the plurality of messages includes a message for each of the plurality of shards of the first replica, delete the first key.

In some of these embodiments, the at least one hardware processor is further configured to: maintain a counter wherein the counter tracks an interval value and logical clock for a plurality of intervals.

In some of these embodiments, the at least one hardware processor is further configured to: determine a second replica that most recently updated a second key and setting the second replica as an eviction owner of the second key; determine that a memory usage of the second replica exceeds a threshold; determine that the second key is at least one of a least frequently used key and a least recently used key of a plurality of keys stored by the second replica; and delete the second key in response to determining that the memory usage of the second replica exceeding the threshold and determining that the second key is at least one of a least frequently used key and a least recently used key of the plurality of keys stored by the second replica.

In some of these embodiments, the at least one hardware processor is further configured to: associate a third key with an expiration data owner; determine that the third key has expired; and determine that the third key is associated with the expiration data owner; and in response to determining that the third key has expired and determining that the third key is associated with the expiration data owner, delete the third key by the expiration data owner.

In some of these embodiments, the at least one hardware processor is further configured to: by each of a plurality of replicas: create a stream of append-only updates for updates to the each of the plurality of replicas; and replicate the stream to each other of the plurality of replicas.

In some of these embodiments, the at least one hardware processor is further configured to: identify a fourth key created by a fourth replica as having a first value and a first type; identify a fifth key created by a fifth replica as having a second value that is different from the first value and a second type that is different from the first type; and apply a precedence to the fourth key and the fifth key based on the first type and the second type so that the fourth key is assigned the second value.

In some of embodiments, methods for implementing conflict-free replicated data types in in-memory data structures are provided, the methods comprising: marking a first key of a conflict-free replicated data type as to be deleted; sending an update message reflecting that the first key is to be deleted to a first replica of an in-memory data structure; receiving a plurality of messages each acknowledging that the first key is to be deleted; determining that the plurality of messages includes a message for each of a plurality of shards of the first replica; and in response to determining that the plurality of messages includes a message for each of the plurality of shards of the first replica, deleting the first key.

In some of these embodiments, the method further comprises: maintaining a counter wherein the counter tracks an interval value and logical clock for a plurality of intervals.

In some of these embodiments, the method further comprises: determining a second replica that most recently updated a second key and setting the second replica as an eviction owner of the second key; determining that a memory usage of the second replica exceeds a threshold; determining that the second key is at least one of a least frequently used key and a least recently used key of a plurality of keys stored by the second replica; and deleting the second key in response to determining that the memory usage of the second replica exceeding the threshold and determining that the second key is at least one of a least frequently used key and a least recently used key of the plurality of keys stored by the second replica.

In some of these embodiments, the method further comprises: associating a third key with an expiration data owner; determining that the third key has expired; and determining that the third key is associated with the expiration data owner; and in response to determining that the third key has expired and determining that the third key is associated with the expiration data owner, deleting the third key by the expiration data owner.

In some of these embodiments, the method further comprises: by each of a plurality of replicas: creating a stream of append-only updates for updates to the each of the plurality of replicas; and replicating the stream to each other of the plurality of replicas.

In some of these embodiments, the method further comprises: identifying a fourth key created by a fourth replica as having a first value and a first type; identifying a fifth key created by a fifth replica as having a second value that is different from the first value and a second type that is different from the first type; and applying a precedence to the fourth key and the fifth key based on the first type and the second type so that the fourth key is assigned the second value.

In some of embodiments, non-transitory computer-readable medium containing computer executable instructions that, when executed by a processor, cause the processor to perform a method for implementing conflict-free replicated data types in in-memory data structures are provided, the method comprising: marking a first key of a conflict-free replicated data type as to be deleted; sending an update message reflecting that the first key is to be deleted to a first replica of an in-memory data structure; receiving a plurality of messages each acknowledging that the first key is to be deleted; determining that the plurality of messages includes a message for each of a plurality of shards of the first replica; and in response to determining that the plurality of messages includes a message for each of the plurality of shards of the first replica, deleting the first key.

In some of these embodiments, the method further comprises: maintaining a counter wherein the counter tracks an interval value and logical clock for a plurality of intervals.

In some of these embodiments, the method further comprises: determining a second replica that most recently updated a second key and setting the second replica as an eviction owner of the second key; determining that a memory usage of the second replica exceeds a threshold; determining that the second key is at least one of a least frequently used key and a least recently used key of a plurality of keys stored by the second replica; and deleting the second key in response to determining that the memory usage of the second replica exceeding the threshold and determining that the second key is at least one of a least frequently used key and a least recently used key of the plurality of keys stored by the second replica.

In some of these embodiments, the method further comprises: associating a third key with an expiration data owner; determining that the third key has expired; and determining that the third key is associated with the expiration data owner; and in response to determining that the third key has expired and determining that the third key is associated with the expiration data owner, deleting the third key by the expiration data owner.

In some of these embodiments, the method further comprises: by each of a plurality of replicas: creating a stream of append-only updates for updates to the each of the plurality of replicas; and replicating the stream to each other of the plurality of replicas.

In some of these embodiments, the method further comprises: identifying a fourth key created by a fourth replica as having a first value and a first type; identifying a fifth key created by a fifth replica as having a second value that is different from the first value and a second type that is different from the first type; and applying a precedence to the fourth key and the fifth key based on the first type and the second type so that the fourth key is assigned the second value.

DETAILED DESCRIPTION

In accordance with some embodiments, mechanism, including systems, methods, and media, for implementing conflict-free replicated data types (CRDTs) in in-memory data structures are provided.

In some embodiments, these mechanisms provide several enhancements on top of well-known, academic-proven CRDTs and allow in-memory data structures (e.g., REDIS) to be deployed in an active-active deployment with minimal changes to APIs of the in-memory data structures (e.g., REDIS) and the known behavior of the in-memory data structures (e.g., REDIS).

In some embodiments, a unique property of the mechanisms described herein is that that they apply CRDT semantics to pre-existing systems of in-memory data structure (e.g., REDIS) data types and commands to create an eventually consistent, distributed system that exhibits application and user experiences that are very similar to those exhibited by a non-distributed in-memory data structures.

Sharding is a well-known and common method of distributing data between nodes (referred to as "shards") in a system in order to achieve scale, e.g., store more data or process transactions faster. When sharding is used, it may be necessary for a system to store configuration information about the sharding topology, e.g., the mapping between data elements and the node that stores and handles them. Because such a system is dynamic in nature, this configuration information can change; for example, if a new node is added to a system and some data should migrate to the new node, the configuration information for the system should be updated. This process is called re-sharding.

CRDTs are generally modelled around replicas, i.e., systems that hold copies of the same data. In systems that use sharding, this often implies that replicas are symmetric and use the same sharding topology. To maintain this invariant, if re-sharding is performed, it needs to be coordinated across different replicas. However, such coordination requires some consensus and goes against the motivation to adopt CRDTs in a distributed system, which motivation is to achieve strong eventual consistency without requiring consensus and introducing the delay consensus involves.

In accordance with some embodiments, the mechanisms described herein can implement replicas that include different numbers of shards and use different sharding topologies. As a result, the replicas may also be re-sharded independently without requiring an end-to-end consensus mechanism, in some embodiments.

In some embodiments, vector clocks (VCs) can be used to register the causal order of operations in and between replicas. In some embodiments, a VC can include a unique identifier (ID) that identifies the replica and/or the replica's shard that performs an operation. In some embodiments, such a VC can be used in different contexts, such as when the VC is attached to a message indicating its logical time or attached to a data element indicating the logical time it was created, modified or deleted.

In some embodiments, a VC can also be used as part of an observed VC (OVC). An observed vector clock is a structure that describes the latest set of updates a single replica has received from other replicas, by referring to the vector clocks associated with these updates.

For example, given Replica A with an ID of 1 and a local clock of 100 (represented as {1,100}), and Replica B with an ID of 2 and a local clock of 110 (represented as {2,110}), Replica C receiving the latest updates from these two replicas would announce an OVC that can be represented as [{1,100},{2,110}], in some embodiments.

To support replicas with multiple shards, in some embodiments, IDs can be constructed such that part of the ID describes a replica and another part describes a shard. For example: 0x0501 and 0x0502 can be two unique IDs that describe shard 0x1 and shard 0x2 that belong to the same replica 0x05, in some embodiments. In some embodiments, all shards have their own dedicated logical clock and are represented in a VC individually. In some embodiments, vector clock operations can be performed in a replica-unique or shard-unique manner, to address the fact that Replica A does not know, and cannot assume anything about, the sharding topology, or even the number of shards used by Replica B.

Figure 1:
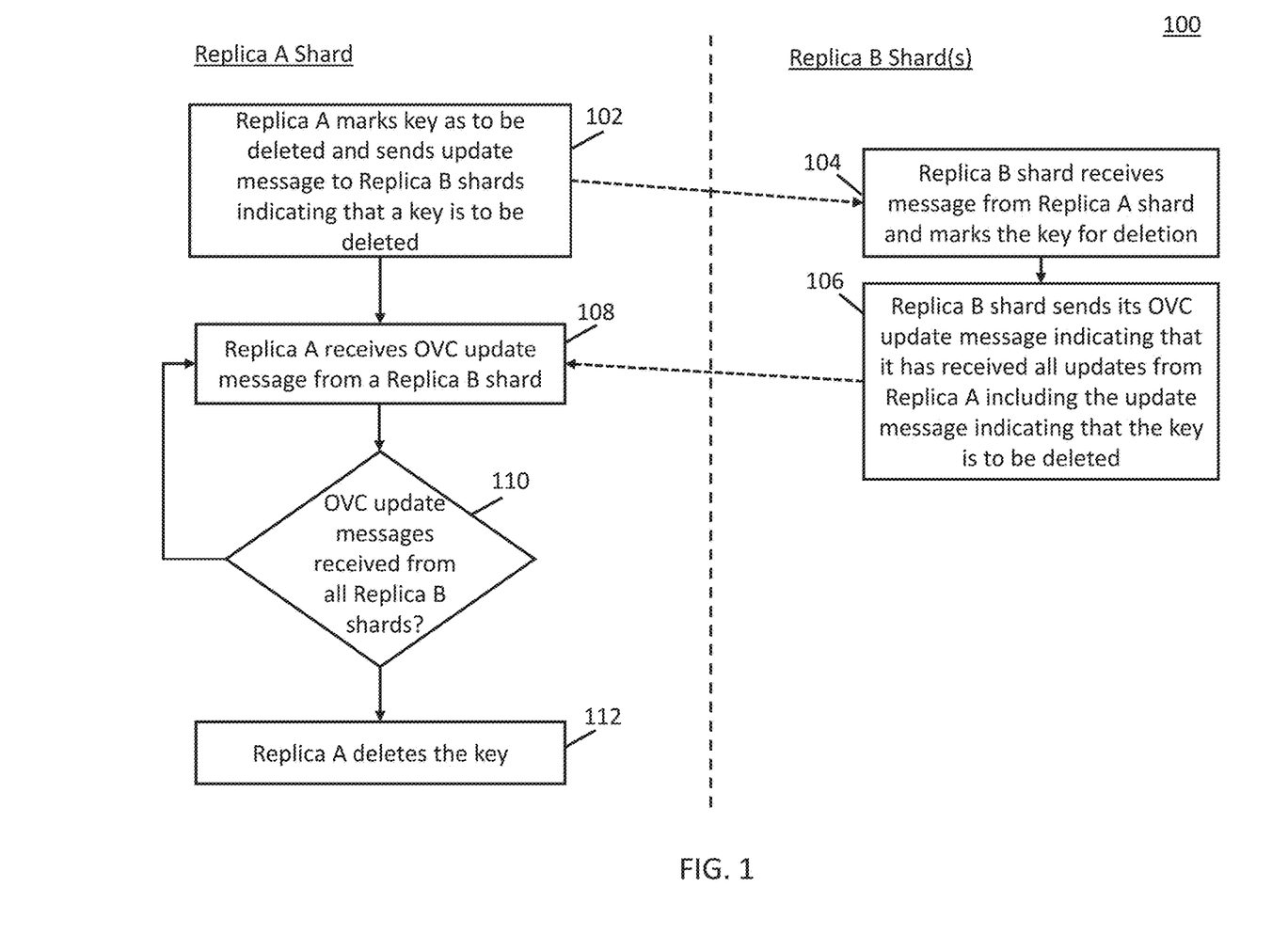
FIG. 1 is an example flow diagram of a process for deleting a key in accordance with some embodiments.

As illustrated by example process 100 of FIG. 1, in some embodiments, two replicas, Replica A and Replica B, may behave as follows:

1) At 102, Replica A marks a key as to be deleted and sends an update message reflecting that the key is to be deleted. While the key is not effectively deleted (but rather has become a tombstone) at this point, once it is marked as such it is no longer visible to the user.

The key cannot be deleted immediately and completely because the local replica (Replica A) needs to maintain information about the fact that the key existed and when it was deleted (relative to other operations). For some data types, the local replica also needs to maintain additional information about the value(s) assigned to the key at the time of deletion in case another update operation takes place on the same key concurrently by a different replica.

Because of that, when the key is marked for deletion it is replaced with a "tombstone" (e.g., the key modified with a flag set to indicate that the key is to be deleted) This tombstone can act as a place-holder that stores information relating to the to-be-deleted key until a future time at which received OVCs indicate that all replicas have acknowledged and processed the deletion and the key may be permanently deleted. Only when such acknowledgement is received, garbage collection can take place and the tombstone is removed.

2) At 104, Replica B, which can have five distinct shards (for example), receives the delete message and performs the local delete operation, replacing the key with a tombstone (also to be deleted later during garbage collection once the replica see that all replicas have acknowledged the delete operation).

3) At 106, at some later point in time, the shards emit their up-to-date OVC in periodic OVC update messages. These messages indicate that the shards have received all updates from Replica A including the update message indicating that the key is to be deleted.

4) Replica A can only perform garbage collection after the specific Replica B shard that holds the deleted key has acknowledged the operation. However, it cannot make assumptions about the identity of that shard. So, it needs to wait until it has received OVC updates from all shards that are part of Replica B acknowledging the operation to delete the key. This is possible thanks to the structure of the OVC update message, where every shard provides additional information about the number of other shards that are part of the replica's sharding topology.

5) At 108, Replica A receives an OVC update message from a Replica B shard.

6) At 110, Replica A determines if it has received OVC update messages from all Replica B shards. If no, process 100 loops back 108.

7) Otherwise, at 112, Replica A deletes the key.

In accordance with some embodiments, causal consistency, which is an optional guarantee that defines what states of the system may or may not be observed, can be provided.

In accordance with some embodiments, consider the following example:

Replica A creates a data element with a value of 'cause'. Replica B receives an update from Replica A, reads the value 'cause' and writes an additional value 'effect'. Replica C receives an update from Replica B, but does not receive the original update from Replica A yet. Causal consistency requires that when the data element is read from Replica C, it will consist of both 'cause' and 'effect', or neither, but not only 'effect'.

In some embodiments, by making stricter guarantees, causal consistency can make a distributed system appear to be similar to simpler, non-distributed systems. This is an advantage for users and application developers. On the other hand, causal consistency comes with a price, as discussed in the example below.

In the example above in accordance with some embodiments, causal consistency can be achieved in two ways:

1) Replica B needs to send a bigger update, including not just 'effect' but also 'cause'. This implies replication consumes more resources.

2) Replica C holds back the update from Replica B, until it receives the original update from Replica A. This implies more memory/storage resources are required, and updates take a longer time to propagate.

In some embodiments, causal consistency can be omitted in order to gain performance and resource utilization advantages. To allow that, in some embodiments, CRDT data types can be implemented with additional properties to enable strong eventual consistency even in cases where updates are received in non-causal order. Non-causal order updates can happen in cases such as this: Replica A adds an element X to a set; Replica B receives the update from Replica A and modifies element X to become X'; and Replica C receives the update from Replica B about X' before receiving the update from Replica A about X.

To support strong eventual consistency in a non-causal consistent system, CRDT datatypes are extended in a way that is type-specific.

In some embodiments, CRDTs may be deployed as a primary database, or as a cache. In a cache configuration, data that is stored in memory may be removed and replaced by newer, more fresh data in some embodiments. The process of discarding old data can be referred to as an "eviction", and it can be initiated when the system reaches a set memory usage limit, in some embodiments.

In accordance with some embodiments, a distributed eviction process can be managed as described below.

In some embodiments, when evicting data, mechanisms as described herein can follow an eviction policy which defines the criteria for selecting what data to evict. In some embodiments, the eviction policy can select data to be evicted based on what data is least frequently used (LFU, or Least Frequently Used) or based on what data is least recently used (LRU, or Least Recently Used). Data can be considered to have been used if it was either written to (updated) or read from, in some embodiments.

In some embodiments, information about writes can be propagated between replicas as part of a replication mechanism. In some embodiments, reads, however, can be processed locally and never replicated as they do not mutate the dataset. In some embodiments, not replicating read operations can contribute greatly to the scalability of a system, as replication bandwidth and computing resources can be preserved.

In some embodiments, because reads are not replicated, the eviction process does not have all the information it requires in order to correctly select keys for eviction. For example, in some embodiments, if a Replica A processes many read operations on a key K but does not write to it, Replica B does not have this information and may consider key K as not frequently or recently used and therefore a candidate for eviction.

In some embodiments, this problem can be solved by leveraging the locality property of data. In some instances, parts of the data will frequently be both read and written to by the same replica. Based on this, in some embodiments, mechanisms as described herein can assign eviction ownership to keys. For example, in some embodiments, for every key, there can be exactly one replica which is considered its eviction owner. In some embodiments, this can be the replica that has most recently updated the key, and which replica most-recently update the key can be derived from the underlying vector clocks that provide operation ordering.

In some embodiments of the mechanisms described herein, replicas only consider locally owned keys for eviction. In some embodiments, eviction can be initiated every time the memory usage of the replica exceeds a certain threshold. In some embodiments, this threshold can be lower than the full memory capacity because, in some cases, memory can only be reclaimed after the eviction operation (key deletion) propagates to all replicas and garbage collection can be initiated.

In some embodiments, this form of eviction is insufficient and a replica may continue to consume more memory. When that happens, a replica may initiate a more aggressive memory eviction process and evict data it does not own in addition to data that is does own, in some embodiments.

In some embodiments, volatile keys, which are keys set to expire and which can be automatically removed after a given time-to-live (TTL), can be used.

In some embodiments, TTL information can be maintained as additional key meta-data and can be updated at any time. In some embodiments, non-volatile keys can have a TTL attached to them to become volatile, volatile keys can become non-volatile, and the TTL of existing volatile keys can be modified.

In some embodiments, replicas can periodically perform an active expiration process in which keys that have expired TTLs are removed. In some embodiments, the mechanisms described herein can be configured to avoid multiple replicas performing this process simultaneously. In some embodiments, doing this can prevent excessive replication traffic that might result when all replicas expire and delete the same keys.

In some embodiments, to avoid this, volatile keys can be associated with an expiration data owner—e.g., the last replica to update the key's TTL. The owner can be determined by relying on causal ordering provided by the vector clocks in some embodiments. A tie breaker mechanism can also be used in case multiple replicas have concurrently updated the TTL in some embodiments. In such cases, in some embodiments, the owner can be set based on any suitable predetermined rules which resolve to a consistent owner on all replicas.

In some embodiments, volatile keys can only be actively expired by the replica that owns the TTL, and never by other replicas. In some embodiments, active expiration is a process whereby keys are scanned and keys that have an expired TTL are removed. In some embodiments, this process proactively removes expired keys, even if users do not actively access these keys.

In some embodiments, on-demand expiration can additionally or alternatively be provided. To understand on-demand expiration, consider the following example scenario:

1. Replica A creates a key with a TTL of 10 seconds.
2. The key is replicated to Replica B which now also stores it along with its TTL.
3. Replication link goes down.
4. About 10 seconds later, Replica A actively expires the key. However, the expiration message that deletes the key cannot reach Replica B at this time.
5. A user attempts to read the key from Replica B. Because the expiration message was not received by Replica B, the key still exists although it should clearly have been expired.

In some embodiments, to address this, keys can be expired on demand. This expiration can take place in some embodiments regardless of whether the local replica owns the key's TTL.

Attempting to read a key that should have been expired can result in the key appearing to have expired, although it still remains in memory, in some embodiments.

Attempting to write (modify) a key that should have been expired can result in an actual expiration of the key in some embodiments. In some embodiments, in response to this, the key can be removed and an expiration message can be replicated to all replicas.

In some embodiments of the mechanisms described herein:
1) Counters may be set, not just incremented or decremented;
2) Counters may be deleted, and over time deleted and re-created with different values; and/or
3) Counters may use a mix of integer and floating point values.

In some embodiments, deletable counter keys can be provided.

In accordance with some embodiments, consider the following example:

Replica A deletes a counter key holding a value of "10". Logically, this operation can be considered to be two operations: resetting the value to 0, and deleting the key. If Replica B performed a concurrent increment on the same key, due to add-wins and observed-remove semantics (e.g., behaviors), the result should be 1.

Add-wins semantics imply that when an add or update operation is performed concurrently to a remove operation, on the same data, the add or update operations take precedence. For example, if Replica A adds an element X to a set while Replica B deletes the same element X from the same set, the result of the operation (after being propagated and consolidated) is a set with element X as part of it.

Observed-remove semantics imply that a replica can only perform a remove operation on data it can observe. For example, Replica A and Replica B both have a set with elements X, Y. Replica A adds element Z to the set, and Replica B concurrently deletes the entire set. The result of the operation, after being propagated and consolidated, is a set that contains element Z—because Replica B could not delete an element it did not (yet) observe.

In accordance with some embodiments, consider another example:

Replica A increments a key K by 1 and delivers the update to Replicas B, C. At this point all replicas hold the value of 1 with the logical clock of the operation performed by Replica A. Next, Replica B deletes the key K and concurrently (before receiving the delete update message), Replica A increments K by 1. Replica C sees two updates: a delete update from Replica B, and an increment update from Replica A. The two operations are concurrent so no total order applies to them. However, Replica C still must be able to determine that Replica B only observed a value of "1" at the time of delete. To do that, counters can be provided that are composed of multiple intervals which hold an interval value and a logical clock. The total value of the counter can be the sum of the intervals. Delete or set operations can also carry a logical clock so there is no ambiguity as to the "portion of the value" they refer to.

So, for example, a counter can have entries as follows in some embodiments:

$$[\{0:0\}, \{1:+1\}, \{3:+1\}, \{6:-1\}, \{9:+1\}]$$

where each interval of the counter can be represented by {t:v}, where t is the beginning time of the interval and v is the value (if no + or −) or change in value (if + or −).

An in-memory data structure (e.g., REDIS) stream can be a monotonically growing list of immutable entries that are uniquely identified, in some embodiments.

Managing an in-memory data structure (e.g., REDIS) compatible stream in an eventually consistent distributed system introduces several challenges. One challenge is ordering: if a stream is monotonic (new entries appended only to its tail), different replicas may end up with inconsistent ordering of entries depending on the arrival order of updates. On the other hand, maintaining a consistent order across all replicas implies the stream is no longer monotonic, because entries may be added in different positions and not just to its tail.

In accordance with some embodiments, the mechanisms described herein can address this problem by each replica maintaining a sub-stream for changes made to the replica and replicating that sub-stream to each other replica. In some embodiments, each replica only appends entries to its sub-stream based on changes made at the replica. Each entry to a sub-stream can have an ID that identifies the replica to which it applies in some embodiments. For example, in some embodiments, an ID allocated to entries for a replica can be assigned a value X so that X modulo Y equals Z, where X is the assigned value of the ID, Z is the maximum number of replicas, and Z is the local replica ID. The value X assigned to each entry in a sub-stream can be unique, in some embodiments.

In some embodiments, a distinction can be made between different stream read modes, which exhibit different semantics (e.g., behaviors). By doing so, mechanisms described herein can be able to overcome the inherent limitations described above, which inherent limitations involve maintaining the guarantees of monotonicity and total order in a distributed, eventually consistent stream In accordance with some embodiments, one read mode that can be provided is a cursor-like XREAD from a streams' tail. In this mode, the reader requests to read the most recent message from the tail of the stream. The reader receives the message along with the stream's ID, and then makes a subsequent read using that ID in order to read the next message in the stream. To serve this mode of reading, a stream can be merge-read from the sub-streams which are already sorted, in some embodiments. In this merge-read, the reader is provided with entries from the streams based on the order (e.g., oldest to newest) in which the entries were appended to the streams and so that duplicate entries across sub-streams are ignored. As a result, in some embodiments, the resulting entries can be guaranteed to be in a single monotonic total order.

In some embodiments, it is possible that one or more updates received from a replica will update a sub-stream after a later/newer entry has been read from a different sub-stream, in which case those received updates may not be seen by the reader.

In some embodiments, a reader that attempts to read specific entries by issuing a more specific read request is be able to observe and read all corresponding entries regardless of their order of arrival. This is the case because each entry in each sub-stream is identified by a corresponding unique ID and the stream allows random access to entries based on that ID. For example, a reader that holds a reference to a specific entry in the stream using its unique entry ID will be able to read that entry, as long as it has already been replicated to the local replica, regardless of the order of other reads.

In some embodiments, another read mode is a consumer read. In some embodiments, consumers can be managed in consumer groups, which maintain information about the delivery of entries to consumers and their acknowledgement of receipt.

In some embodiments, streams of the mechanisms described herein can make more relaxed ordering guarantees to consumers. For example, in some embodiments, a consumer may receive and process a newer entry, and later receive an older entry, which has not been acknowledged and therefore was reclaimed for re-distribution to the consumer group.

In some embodiments, consumer reads in a stream of the mechanisms described herein follow the same semantics, and may therefore return entries in any order, not following any monotonic or total order, delivering older entries after newer entries have already been delivered.

In some embodiments, the entire stream itself can also be an in-memory data structure (e.g., REDIS) key. In some embodiments, this key can be identified by name and can be deleted or created any number of times by replicas, effectively creating different versions of the same stream over time.

In a setting that is not causal consistent, this can lead to ambiguity about the association of elements to a specific version of the stream key.

For example, assume Replica A appends an entry X with an ID of 100 to a stream. The change is replicated to Replica B and Replica C. Replica B deletes the stream key and propagates the delete to Replica A. Replica A re-creates the stream key with the same name, appends an entry Y with an ID of 50 to the stream and replicates the change to replica C. From Replica C's perspective, this could be perceived as an invalid change because it violates monotonicity (appending an ID of 50 following an ID of 100).

To address this, as well as many other similar issues, when a sub-stream is created, the sub-stream can be associated with a local logical clock. Receiving an update for a sub-stream where the sub-stream's logical clock is smaller than the update's logical clock indicates the sub-stream's key is stale and can be replaced.

In some embodiment, efficient acknowledgement propagation can be provided using aggregated consecutive acknowledgements.

In some embodiments, replication between replicas can be managed by a peer replication protocol, as described below.

In some embodiments, efficiency is an important aspect of replication between replicas. There can be many aspects to efficiency, such as the network traffic required to deliver replication messages, memory resources used on replicas to store additional replication-related state, CPU resources used to process replication messages, etc., in some embodiments.

In some embodiments, optimizing one aspect of the replication mechanism can trade off efficiency of another aspect. For example, in some embodiments, applying a compression algorithm to the replication stream trades off CPU cycles for network bandwidth.

In some embodiments, the peer replication protocol can use a combination of three different methods to maintain replication efficiency:

1) Partial backlog replication. While the replication link is active, the source replica can continuously maintain a backlog that holds the most recent set of replication messages. The backlog can have a limited amount of memory allocated to it, and old data can be discarded as new data is appended.

In some embodiments, if a replication link is dropped and re-established, the target replica can request the source replica to deliver replication messages starting from the last message (byte offset) it has received. In some embodiments, if the requested data still exists in the source replication backlog, it can be delivered and the replication process resumed. In some embodiments, this method of re-establishing a replication link can be very efficient as it requires very little resources on the source replica's end.

In some embodiments, if a source replica is unable to fulfill a partial backlog replication request (because the backlog data was already replaced by newer data), the two replicas can fall back to negotiate partial state replication.

2) Partial state replication. The target replica can determine the logical vector clock time of the last update it has received, and can request the source replica to only send information about keys that have been modified after that logical time. Because vector clocks track the order of updates per replica, this request may be further fine-tuned to ask only for keys that have been updated by one or more specific replicas at specific times (expressed by those replicas' vector clocks). For example, the target replica can ask the source replica for updates made by replica X after time tx and for updates made by Replica Y after time ty. In addition, the target replica may ask to skip keys updated by specific replicas altogether (for example, if they have already been replicated directly from those replicas).

In some embodiments, the source replica can then iterate the entire dataset looking for keys with a vector clock that indicates that the keys have been modified after the requested logical time. Those keys can be serialized and delivered to the target replica in some embodiments.

In some embodiments, the target replica receives the serialized keys, deserializes them and loads them into its dataset. If a key already exists, the target replica can use the CRDT meta-data in order to identify new changes and incorporate those changes into its existing key.

In some embodiments, keys that do not exist locally can simply be created based on the received state information.

3) Full state replication. This is similar to (2) above, but involves delivering all keys from the source replica to the target replica. It is essentially a subset and a special case of the partial state replication.

In some embodiments, when a key is updated by a replica, there are two ways information about the update can be propagated to other replicas: CRDT Effect messages and CRDT State Merge messages.

In some embodiments, CRDT Effect messages describe an operation that was applied to a key. In order to be properly processed, the recipient of a CRDT Effect message needs to have prior information about the updated key in some embodiments. For example, an effect may describe an operation such as "add element X to a set". Because of this, CRDT Effect messages can be used between replicas after an initial state synchronization has been established in some embodiments.

In some embodiments, a CRDT State Merge message, on the other hand, carries all the information a replica holds for a given key. This includes both actual data, as provided by the user, as well as CRDT meta-data such as the vector clocks associated with different operations performed on the key in some embodiments. In some embodiments, there are some properties to CRDT State Merge messages:

1) A replica that receives a CRDT State Merge message for a specific key is able to reconstruct the full state of the key, which will be identical to the key in the source replica, in some embodiments.

2) CRDT State Merge messages can always be applied on an existing key and result with consistent results in some embodiments. For example, Replica A holds key K with some changes applied to it (Ka), and Replica B holds key K with other changes applied to it (Kb). Replica A sends a CRDT State Merge message for Ka to Replica B, and Replica B sends a CRDT State Merge message for Kb to Replica A. After both replicas perform the merge, the key K is guaranteed to transition to a common state Kcommon that follows the specific conflict resolution semantics applicable to the data type and type of changes applied to the key.

In some embodiments, once a target replica has synchronized with the source replica in one of the above methods, the replication link can remain up. In some embodiments, the source replica can use the replication link to continuously deliver the following messages:

1) CRDT Effect messages that describe changes to the dataset.

2) OVC update messages that the source replica uses to periodically announce the logical time of the latest operations it has observed being replicated from other replicas.

In some embodiments, it may be assumed that changes to the dataset of a replica are durable and monotonic.

In accordance with some embodiments, consider the following example:

Replica A updates a counter key and increments its value from X to Y (with an operation that is assigned a local vector clock time T). After replicating this update to all other replicas, Replica A must not lose its state and revert to a value of X. Also, it must not lose its current vector clock time T; any future operation should have a clock time greater than T.

In some embodiments, datasets can be stored in process memory, so partial loss of data is not possible (because it would lead to process crash or full system fault). In addition, all updates can be optionally written to an Append Only File (AOF) which the replica can read in case of process or full system restart, in some embodiments.

In some embodiments, a replica in accordance with the mechanisms described here may start in one of three states:
1) No dataset loaded from disk (because persistence was not used, or because of a fault).
2) Part of the dataset loaded from disk. For example, if the AOF file was truncated or not fully synchronized to disk.
3) The entire dataset loaded from disk, including the latest local writes.

In some embodiments, before becoming active, a loaded replica may need to validate that it has managed to recover the dataset and that there are no local writes that have already been replicated to other replicas but not loaded locally. In some embodiments, this state can be referred to as a stale state. In some embodiments, the replica can remain in stale state until it has negotiated replication links with other replicas and can confirm that no lost updates exist.

In some embodiments, if lost updates do exist, they can be identified using a vector clock time carried by the updates that relates to a replica operation that is more advanced than the replica's current vector clock operation time.

In some embodiments, this hybrid method of recovery can provide a way for a replica in accordance with the mechanisms described herein to recover more quickly than relying solely on re-replicating the entire dataset over the network from remote replicas. This may be the case, for example, because access to local storage is faster than geographically distributed data center links.

In some embodiments, another concern with eventual consistency and recovery involves lost garbage collection information.

In accordance with some embodiments, consider the following example:

Replica A deletes a certain key. The delete operation is replicated to Replica B, and the key remains as a tombstone until an OVC update message is received from all participating replicas, confirming the delete operation has completed. Only then can the key be garbage-collected and the tombstone removed. Replica B receives the delete operation, schedules it to be written to the AOF file and performs the local deletion (leaving a tombstone). At a later time, Replica B emits an OVC update message acknowledging that it has seen the delete operation and signaling that it is safe to garbage collect the tombstone. Immediately after that, Replica B fails without completing the write to the AOF file. Meanwhile, Replica A receives the OVC message and performs the garbage collection, removing the tombstone. Replica B then restarts and re-loads data from its AOF file. The result is a significant inconsistency—Replica B holds a key that Replica A has deleted and garbage collected in the past, a state which can no longer be reconciled.

In some embodiments, to address this condition, the mechanisms described herein can include a delayed OVC mechanism.

The purpose of this mechanism is to ensure that the OVC a replica announces to other replicas is consistent with the information that has already been written and committed to the AOF file. To do so, the replica first writes data to the AOF file and requests the operating system to commit it to disk. The replica will announce the updated OVC only after this operation has completed successful. Until that time, it will continue to announce previous OVC information (which has previously been committed to disk).

This way, even if the replica crashes and needs to restart from disk, it can guarantee that the OVC information it holds is never less up-to-date than the OVC announcements it has made in the past.

In some embodiments, the mechanisms described herein can use a single keyspace for storing all keys, which may be of arbitrary types. In some embodiments, a key can be created implicitly with a type that is inferred from the write operation that created it. In some embodiments, key access can be type-checked, so, for example, attempting to add a set member to a key that was previously created as a list will fail.

In some embodiments, in an eventually consistent distributed system, such checks cannot be relied on because keys may be created or manipulated concurrently.

In some embodiments, the mechanisms described herein can employ a mechanism that defines a strict type precedence when handling key type conflict resolution. For example, in some embodiments, a Replica A can create a list key K and append elements to it. Replica B can create a string key K with a specific value. The two operations can be concurrent (e.g., Replicas A and B are disconnected from each other). When the replicas are re-connected and updates converge, key K can be a string type and updates performed by Replica A can be discarded. In some embodiments, this can happen because string types take precedence over other types, which can be derived from the non-distributed in-memory data structure (e.g., REDIS) behavior. Any suitable precedence rules can be used in some embodiments.

In some embodiments, in-memory data structures (e.g., REDIS) can also use an implicit key deletion mechanism. Container keys, such as hashes, lists, sorted sets or sets can be implicitly deleted when the last element in the container key is removed, in some embodiments.

In some embodiments, the mechanisms described herein can distinguish the two operations and track them individually with distinct vector clocks. In accordance with some embodiments, for example, consider that both Replica A and Replica B maintain a set key with three elements [1, 2, 3]. Replica A performs a write operation that removes elements [1, 2, 3] leaving the set empty. As a result, it also registers an implicit operation that deletes the key. Concurrently, Replica B performs a write operation that appends [4] to the key. After all update propagate and converge, because of add-wins and observed-remove semantics, both Replicas A and B will have set key with [4].

In some embodiments, any suitable hardware can be used to implement the mechanisms described herein. For example, in some embodiments, replicas in an in-memory data structure (e.g., REDIS) system can each reside in one or many hardware servers coupled to each other over one or more local or wide area networks, including the Internet.

Any of these servers can be implemented using any suitable general-purpose computer or special-purpose computer in some embodiments.

Figure 2:
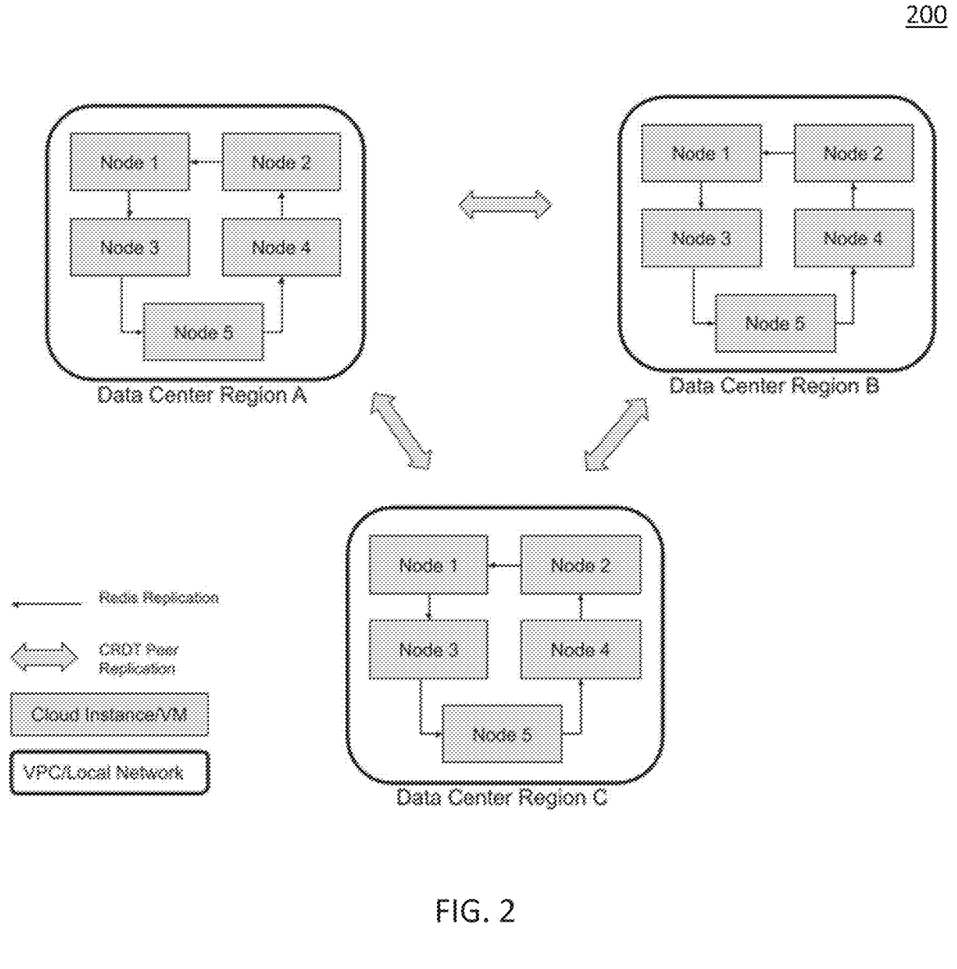
FIG. 2 is an example block diagram of system in accordance with some embodiments.

Turning to FIG. 2, an example 200 of hardware that can be used in accordance with some embodiments of the disclosed subject matter is shown. As illustrated, hardware 200 can include a plurality of data centers, each in a different region in some embodiments. Although three data centers are shown and each data center is in its own region, any suitable number of data centers can be used and any suitable number of regions can be used in some embodiments.

As also illustrated, each data center can have five (or any other suitable number of nodes) in some embodiments. A node can be implemented on one or more physical or virtual servers. A physical or virtual server can host any suitable number of nodes in some embodiments.

A physical or virtual server can be implemented on any suitable general-purpose computer or special purpose computer in some embodiments.

Any such general-purpose computer or special-purpose computer can include any suitable hardware. For example, as illustrated in example hardware 300 of FIG. 3, such hardware can include hardware processor 302, memory and/or storage 304, an input device controller 306, an input device 308, display/audio drivers 310, display and audio output circuitry 312, communication interface(s) 314, an antenna 316, and a bus 318.

Figure 3:
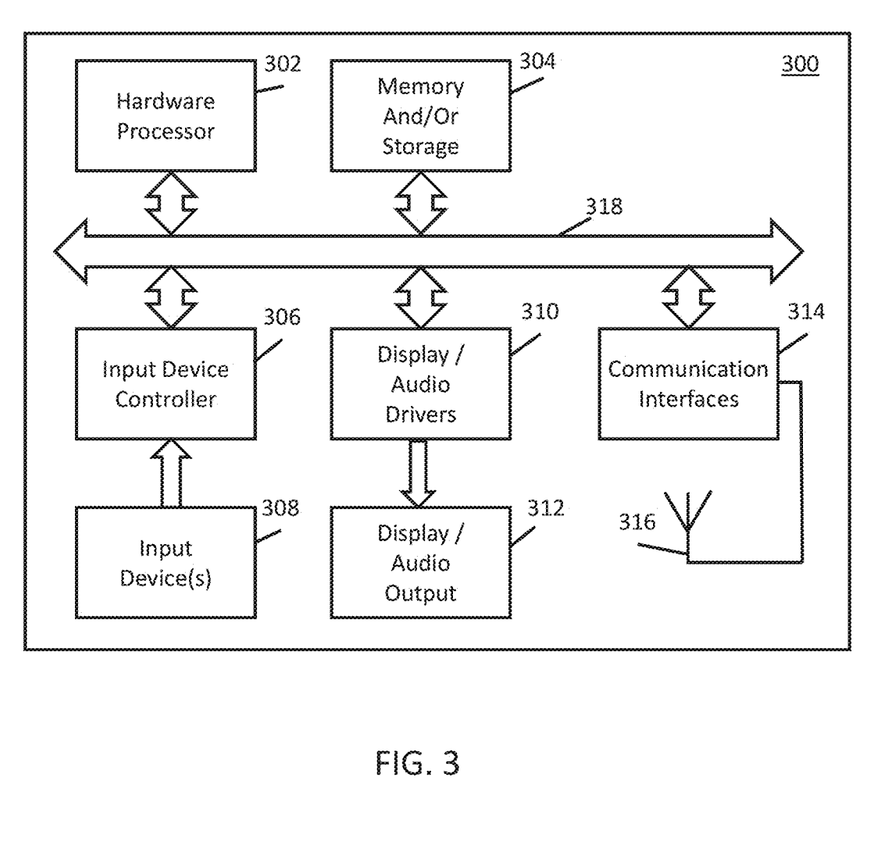
FIG. 3 is an example block diagram of hardware in accordance with some embodiments.

Hardware processor 302 can include any suitable hardware processor, such as a microprocessor, a micro-controller, digital signal processor(s), dedicated logic, and/or any other suitable circuitry for controlling the functioning of a general-purpose computer or a special purpose computer in some embodiments.

Memory and/or storage 304 can be any suitable memory and/or storage for storing programs, data, and/or any other suitable information in some embodiments. For example, memory and/or storage 304 can include random access memory, read-only memory, flash memory, hard disk storage, optical media, and/or any other suitable memory.

Input device controller 306 can be any suitable circuitry for controlling and receiving input from input device(s) 308 in some embodiments. For example, input device controller 306 can be circuitry for receiving input from an input device 308, such as a touch screen, from one or more buttons, from a voice recognition circuit, from a microphone, from a camera, from an optical sensor, from an accelerometer, from a temperature sensor, from a near field sensor, and/or any other type of input device.

Display/audio drivers 310 can be any suitable circuitry for controlling and driving output to one or more display/audio output circuitries 312 in some embodiments. For example, display/audio drivers 310 can be circuitry for driving one or more display/audio output circuitries 312, such as an LCD display, a speaker, an LED, or any other type of output device.

Communication interface(s) 314 can be any suitable circuitry for interfacing with one or more communication networks. For example, interface(s) 314 can include network interface card circuitry, wireless communication circuitry, and/or any other suitable type of communication network circuitry.

Antenna 316 can be any suitable one or more antennas for wirelessly communicating with a communication network in some embodiments. In some embodiments, antenna 316 can be omitted when not needed.

Bus 318 can be any suitable mechanism for communicating between two or more components 302, 304, 306, 310, and 314 in some embodiments.

Any other suitable components can additionally or alternatively be included in hardware 300 in accordance with some embodiments.

In some embodiments, any suitable computer readable media can be used for storing instructions for performing the functions and/or processes described herein. For example, in some embodiments, computer readable media can be transitory or non-transitory. For example, non-transitory computer readable media can include media such as non-transitory magnetic media (such as hard disks, floppy disks, and/or any other suitable magnetic media), non-transitory optical media (such as compact discs, digital video discs, Blu-ray discs, and/or any other suitable optical media), non-transitory semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for implementing conflict-free replicated data types in in-memory data structures within a distributed system, comprising:
   a memory; and
   at least one hardware processor coupled to the memory and collectively configured to:
   mark a first key of a conflict-free replicated data type implemented in an in-memory data structure to be deleted;
   send an update message to a first replica of the in-memory data structure, wherein the update message is associated with the first key to be deleted from the first replica of the in-memory data structure, wherein the first replica of the in-memory data structure includes a plurality of shards;
   receive a plurality of messages from the first replica of the in-memory data structure, wherein the plurality of message is in a vector clock structure and wherein each message of the plurality of messages corresponds to its corresponding shard of the plurality of shards, wherein the each message of the plurality of messages is an acknowledgement by the corresponding shard that the first key is to be deleted, wherein at least one message of the plurality of messages identifies a number of other shards in the plurality of shards, and wherein at least one shard of the plurality of shards does not hold the first key;
   and
   in response to receiving the plurality of messages, delete the first key.

2. The system of claim 1, where the at least one hardware processor is further configured to:
   maintain a counter wherein the counter tracks an interval value and logical clock for a plurality of intervals.

3. The system of claim 1, where the at least one hardware processor is further configured to:

determine a second replica that most recently updated a second key and setting the second replica as an eviction owner of the second key;
determine that a memory usage of the second replica exceeds a threshold;
determine that the second key is at least one of a least frequently used key and a least recently used key of a plurality of keys stored by the second replica; and
delete the second key in response to determining that the memory usage of the second replica exceeding the threshold and determining that the second key is at least one of a least frequently used key and a least recently used key of the plurality of keys stored by the second replica.

4. The system of claim 1, where the at least one hardware processor is further configured to:
associate a third key with an expiration data owner;
determine that the third key has expired; and
determine that the third key is associated with the expiration data owner; and
in response to determining that the third key has expired and determining that the third key is associated with the expiration data owner, delete the third key by the expiration data owner.

5. The system of claim 1, where the at least one hardware processor is further configured to:
by each of a plurality of replicas:
create a stream of append-only updates for updates to the each of the plurality of replicas; and
replicate the stream to each other of the plurality of replicas.

6. The system of claim 1, where the at least one hardware processor is further configured to:
identify a fourth key created by a fourth replica as having a first value and a first type;
identify a fifth key created by a fifth replica as having a second value that is different from the first value and a second type that is different from the first type; and
apply a precedence to the fourth key and the fifth key based on the first type and the second type so that the fourth key is assigned the second value.

7. The system of claim 1, wherein the first key marked to be deleted becomes invisible to a user without being deleted.

8. The system of claim 1, wherein the at least one message of the plurality of messages includes data associated with sharding topology of the plurality of shards.

9. A method for implementing conflict-free replicated data types in in-memory data structures within a distributed system, comprising:
marking a first key of a conflict-free replicated data type implemented in an in-memory data structure to be deleted;
sending an update message to a first replica of the in-memory data structure, wherein the update message is associated with the first key to be deleted from the first replica of the in-memory data structure, wherein the first replica of the in-memory data structure includes a plurality of shards;
receiving a plurality of messages from the first replica of the in-memory data structure, wherein the plurality of message is in a vector clock structure and wherein each message of the plurality of messages corresponds to its corresponding ea shard of the plurality of shards, wherein the each message of the plurality of messages is an acknowledgement by the corresponding shard that the first key is to be deleted, wherein at least one message of the plurality of messages identifies a number of other shards in the plurality of shards, and wherein at least one of the plurality of shards does not hold the first key; and
in response to receiving the plurality of messages, deleting the first key.

10. The method of claim 9, further comprising:
maintaining a counter wherein the counter tracks an interval value and logical clock for a plurality of intervals.

11. The method of claim 9, further comprising:
determining a second replica that most recently updated a second key and setting the second replica as an eviction owner of the second key;
determining that a memory usage of the second replica exceeds a threshold;
determining that the second key is at least one of a least frequently used key and a least recently used key of a plurality of keys stored by the second replica; and
deleting the second key in response to determining that the memory usage of the second replica exceeding the threshold and determining that the second key is at least one of a least frequently used key and a least recently used key of the plurality of keys stored by the second replica.

12. The method of claim 9, further comprising:
associating a third key with an expiration data owner;
determining that the third key has expired; and
determining that the third key is associated with the expiration data owner; and
in response to determining that the third key has expired and determining that the third key is associated with the expiration data owner, deleting the third key by the expiration data owner.

13. The method of claim 9, further comprising: by each of a plurality of replicas:
creating a stream of append-only updates for updates to the each of the plurality of replicas; and
replicating the stream to each other of the plurality of replicas.

14. The method of claim 9, further comprising:
identifying a fourth key created by a fourth replica as having a first value and a first type;
identifying a fifth key created by a fifth replica as having a second value that is different from the first value and a second type that is different from the first type; and
applying a precedence to the fourth key and the fifth key based on the first type and the second type so that the fourth key is assigned the second value.

15. A non-transitory computer-readable medium containing computer executable instructions that, when executed by a processor, cause the processor to perform a method for implementing conflict-free replicated data types in in-memory data structures within a distributed system, the method comprising:
marking a first key of a conflict-free replicated data type implemented in an in-memory data structure to be deleted;
sending an update message to a first replica of the in-memory data structure, wherein the update message is associated with the first key to be deleted from the first replica of the in-memory data structure, wherein the first replica of the in-memory data structure includes a plurality of shards;
receiving a plurality of messages from the first replica of the in-memory data structure, wherein the plurality of message is in a vector clock structure and wherein each message of the plurality of messages corresponds to its corresponding shard of the plurality of shards, wherein the each message of the plurality of messages is an acknowledgement by the corresponding shard that the first key is to be deleted, wherein at least one message of the plurality of messages identifies a number of other shards in the plurality of shards, and wherein at least one of the plurality of shards does not hold the first key; and in response to receiving the plurality of messages, deleting the first key.

16. The non-transitory computer-readable medium of claim 15, wherein the method further comprises:
maintaining a counter wherein the counter tracks an interval value and logical clock for a plurality of intervals.

17. The non-transitory computer-readable medium of claim 15, wherein the method further comprises:
determining a second replica that most recently updated a second key and setting the second replica as an eviction owner of the second key;
determining that a memory usage of the second replica exceeds a threshold;
determining that the second key is at least one of a least frequently used key and a least recently used key of a plurality of keys stored by the second replica; and
deleting the second key in response to determining that the memory usage of the second replica exceeding the threshold and determining that the second key is at least one of a least frequently used key and a least recently used key of the plurality of keys stored by the second replica.

18. The non-transitory computer-readable medium of claim 15, wherein the method further comprises:
associating a third key with an expiration data owner;
determining that the third key has expired; and
determining that the third key is associated with the expiration data owner; and
in response to determining that the third key has expired and determining that the third key is associated with the expiration data owner, deleting the third key by the expiration data owner.

19. The non-transitory computer-readable medium of claim 15, wherein the method further comprises:
by each of a plurality of replicas:
creating a stream of append-only updates for updates to the each of the plurality of replicas; and
replicating the stream to each other of the plurality of replicas.

20. The non-transitory computer-readable medium of claim 15, wherein the method further comprises:
identifying a fourth key created by a fourth replica as having a first value and a first type;
identifying a fifth key created by a fifth replica as having a second value that is different from the first value and a second type that is different from the first type; and
applying a precedence to the fourth key and the fifth key based on the first type and the second type so that the fourth key is assigned the second value.

* * * * *